(12) United States Patent
Tan et al.

(10) Patent No.: US 10,244,180 B2
(45) Date of Patent: Mar. 26, 2019

(54) IMAGING MODULE AND READER FOR, AND METHOD OF, EXPEDITIOUSLY SETTING IMAGING PARAMETERS OF IMAGERS FOR IMAGING TARGETS TO BE READ OVER A RANGE OF WORKING DISTANCES

(71) Applicant: SYMBOL TECHNOLOGIES, LLC, Lincolnshire, IL (US)

(72) Inventors: Chinh Tan, Setauket, NY (US); David P Goren, Smithtown, NY (US); Harry E. Kuchenbrod, Kings Park, NY (US); Carl D. Wittenberg, Water Mill, NY (US)

(73) Assignee: Symbol Technologies, LLC, Holtsville, NY (US)

( * ) Notice: Subject to any disclaimer, the term of this patent is extended or adjusted under 35 U.S.C. 154(b) by 0 days.

(21) Appl. No.: 15/083,493

(22) Filed: Mar. 29, 2016

(65) Prior Publication Data

US 2017/0289421 A1 Oct. 5, 2017

(51) Int. Cl.
*G06K 7/10* (2006.01)
*H04N 5/225* (2006.01)
*H04N 5/235* (2006.01)

(52) U.S. Cl.
CPC ....... *H04N 5/2352* (2013.01); *G06K 7/10722* (2013.01); *G06K 7/10881* (2013.01); *H04N 5/2256* (2013.01); *H04N 5/2258* (2013.01); *H04N 5/2354* (2013.01); *G06K 2007/10524* (2013.01)

(58) Field of Classification Search
None
See application file for complete search history.

(56) References Cited

U.S. PATENT DOCUMENTS

| | | | |
|---|---|---|---|
| 4,506,150 A | 3/1985 | Ogasawara | |
| 5,702,059 A | 12/1997 | Chu et al. | |
| 5,808,296 A | 9/1998 | McMonagle et al. | |
| 6,621,987 B1 | 9/2003 | Tsai et al. | |
| 7,148,923 B2 | 12/2006 | Harper et al. | |

(Continued)

OTHER PUBLICATIONS

Utility U.S. Appl. No. 15/171,266, filed Jun. 2, 2016, entitled "Imaging Module and Reader for, and Method of, Expeditiously Setting Imaging Parameters of an Imager Based on the Imaging Parameters Previously Set for a Default Imager" (25 pages).

*Primary Examiner* — Twyler L Haskins
*Assistant Examiner* — Quan Pham
(74) *Attorney, Agent, or Firm* — Yuri Astvatsaturov (57) ABSTRACT

An imaging reader has near and far imagers for imaging illuminated targets to be read over a range of working distances. A range finder determines a distance to a target. A default imager captures a minor portion of an image of the target, and rapidly determines its light intensity level. At least one of the imagers is selected based on the determined distance and/or the determined light intensity level. The exposure and/or gain of the selected imager is set to a predetermined value, and an illumination level is determined, also based on the determined light intensity level and/or the determined distance. The selected imager, which has been set with the predetermined value, captures an image of the target, which has been illuminated at the illumination light level.

20 Claims, 7 Drawing Sheets

(56) References Cited

U.S. PATENT DOCUMENTS

| | | |
|---|---|---|
| 7,227,117 B1 | 6/2007 | Lackemann et al. |
| 7,546,951 B2 | 6/2009 | Kotlarsky et al. |
| 7,780,089 B2 | 8/2010 | Wang |
| 2002/0176605 A1 | 11/2002 | Stafsudd et al. |
| 2005/0140786 A1 | 6/2005 | Kaplinsky |
| 2005/0199719 A1* | 9/2005 | Hepworth ................. G06K 7/12 235/454 |
| 2006/0011725 A1 | 1/2006 | Schnee |
| 2006/0065732 A1 | 3/2006 | Barkan |
| 2006/0170816 A1* | 8/2006 | Silverstein ........... H04N 5/2352 348/362 |
| 2007/0002163 A1 | 1/2007 | Madej et al. |
| 2007/0102520 A1 | 5/2007 | Carlson et al. |
| 2007/0177048 A1 | 8/2007 | Van Dyke et al. |
| 2008/0296379 A1 | 12/2008 | Hepworth et al. |
| 2009/0001163 A1 | 1/2009 | Barkan et al. |
| 2010/0147957 A1* | 6/2010 | Gurevich ........... G06K 7/10712 235/472.03 |
| 2010/0252635 A1 | 10/2010 | Drzymala et al. |
| 2012/0000982 A1 | 1/2012 | Gao et al. |
| 2012/0091206 A1 | 4/2012 | Goren |
| 2012/0126015 A1* | 5/2012 | Wittenberg ........ G06K 7/10881 235/462.41 |
| 2012/0181338 A1 | 7/2012 | Gao |
| 2013/0083201 A1 | 4/2013 | Takacs |
| 2013/0248602 A1 | 9/2013 | He et al. |
| 2014/0362286 A1 | 12/2014 | Komi et al. |
| 2015/0244923 A1 | 8/2015 | Lee et al. |

* cited by examiner

IMAGING MODULE AND READER FOR, AND METHOD OF, EXPEDITIOUSLY SETTING IMAGING PARAMETERS OF IMAGERS FOR IMAGING TARGETS TO BE READ OVER A RANGE OF WORKING DISTANCES

BACKGROUND OF THE INVENTION

The present invention relates generally to an imaging module and an imaging reader for, and a method of, expeditiously setting one or more imaging parameters, such as exposure and/or gain values, of at least one imager for imaging targets to be electro-optically read by image capture over a range of working distances.

Solid-state imaging systems or imaging readers have been used, in both handheld and/or hands-free modes of operation, to electro-optically read targets, such as one- and two-dimensional bar code symbol targets, and/or non-symbol targets, such as documents. A handheld imaging reader includes a housing having a handle held by an operator, and an imaging module, also known as a scan engine, supported by the housing and aimed by the operator at a target during reading. The imaging module includes an imaging assembly having a solid-state imager or imaging sensor with an imaging array of photocells or light sensors, which correspond to image elements or pixels in an imaging field of view of the imager, and an imaging lens assembly for capturing return light scattered and/or reflected from the target being imaged, and for projecting the return light onto the array to initiate capture of an image of the target. Such an imager may include a one- or two-dimensional charge coupled device (CCD) or a complementary metal oxide semiconductor (CMOS) device and associated circuits for producing and processing electronic signals corresponding to a one- or two-dimensional array of pixel data over the imaging field of view. In order to increase the amount of the return light captured by the array, for example, in dimly lit environments, the imaging module generally also includes an illuminating light assembly for illuminating the target with illumination light in an illumination pattern for reflection and scattering from the target.

In some applications, for example, in warehouses, it is sometimes necessary for the same reader to read not only far-out targets, e.g., on products located on high overhead shelves, which are located at a far-out range of working distances on the order of thirty to fifty feet away from the reader, but also close-in targets, e.g., on products located at floor level or close to the operator, which are located at a close-in range of working distances on the order of less than two feet away from the reader. The reader may illuminate the far-out targets by emitting an illumination light at an intense, bright level, and capturing the return light from the illuminated far-out targets by employing a far-out imager having a relatively narrow field of view, and may illuminate the close-in targets by emitting the illumination light at a less intense, dimmer level, and capturing the return light from the illuminated close-in targets by employing a close-in imager having a relatively wide field of view. This variable illumination light level enables each such target to be more reliably imaged and successfully read.

However, the use of more than one imager and the variable illumination level presents a challenge to reader performance. For optimum reader performance, each target must be read by the correct imager; the correct imager should be set with one or more optimum imaging parameters, such as exposure values and/or gain values; and the illumination light should be set at an optimum illumination light level or value. These values are different for each imager, and vary, among other things, as a function of the working distance and of the illumination light level. Increasing the exposure and/or the gain values of the imager, as well as increasing the illumination light level, will increase the captured image brightness of the image of the target, and vice versa.

In order to set an imager with one or more optimum imaging parameters, it is known for the imager to capture an entire image from the target, to analyze the brightness of the entire image, to change the imaging parameters based on the analysis of the entire image, to capture another entire image from the target, and to repeat all the steps of this process for as many times as it takes until the brightness of the entire image is within an acceptable level. An automatic exposure controller (AEC) is typically used to control the imager's exposure, and an automatic gain controller (AGC) is typically used to control the imager's gain. A typical known strategy is to use exposure priority, in which the exposure is increased first until a maximum exposure time or threshold (typically around 4-8 ms in order to reduce hand jitter motion effects for a handheld reader) is reached. If the image brightness is still too low, then the gain is increased. This strategy maximizes the signal-to-noise ratio (SNR) of the imager, because the gain is only increased when necessary. Although generally satisfactory for its intended purpose, this known process is very slow and inefficient in practice, especially when more than one imager is involved, and when the entire known process has to be repeated for each additional imager. Reader performance can be deemed sluggish, and is unacceptable in many applications.

Accordingly, there is a need to expeditiously select the correct imager in such readers, to expeditiously set the selected imager with one or more optimum imaging parameters, and to expeditiously set the illuminating light assembly to illuminate the target with illumination light at an optimum illumination light level, in order to more rapidly, efficiently, reliably, and successfully read both far-out targets and close-in targets with the same reader.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The system and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

One aspect of the present disclosure relates to an imaging module, also known as a scan engine, for setting one or more imaging parameters, e.g., exposure and/or gain values, of at least one imager for imaging targets to be electro-optically read over a range of working distances away from the module. Another aspect of the present disclosure relates to an imaging reader having a housing for supporting the imaging module, and a light-transmissive window on the housing.

In both aspects, the imaging module comprises an imaging assembly including a near imager for imaging targets over a relatively wider imaging field of view, and a far imager for imaging targets over a relatively narrower imaging field of view. An illuminating light assembly illuminates targets with illumination light. A range finder determines a distance to a target. A main controller or programmed microprocessor controls a default one of the imagers, for example, the far imager, to capture a minor portion of an image of the target, determines a light intensity level of the captured minor portion of the image, selects at least one of the imagers based on the determined distance and/or the determined light intensity level, and controls the illuminating light assembly to illuminate the target with illumination light at an illumination light level based on the determined distance and/or the determined light intensity level. In addition, the main controller sets at least one of the imaging parameters of the selected at least one imager to a predetermined value based on the determined light intensity level and/or the determined distance, and controls the selected at least one imager, which has been set with the predetermined value, to capture an image of the target, which has been illuminated at the illumination light level.

A memory is accessible to the main controller and stores a plurality of predetermined values, e.g., exposure values and/or gain values, of the at least one imaging parameter for retrieval by the main controller from a look-up table. These predetermined values are different based on the determined light intensity level and/or the determined distance. Advantageously, the default imager is controlled by the main controller to operate at a predetermined frame rate, e.g., 60 frames per second (fps). The main controller determines the light intensity level from the minor portion of the image at a rate faster than the predetermined frame rate. By way of numerical example, if the image is subdivided into four quadrants, then the minor portion of the image can be one of these quadrants, in which case, the main controller can determine the light intensity level from the minor portion of the image at a rate that is four times faster, e.g., 240 fps, than the predetermined frame rate. Thus, the selected imager is more rapidly and efficiently set with optimum exposure values and/or gain values than heretofore.

Still another aspect of the present disclosure relates to a method of setting one or more imaging parameters of at least one imager for imaging targets to be electro-optically read over a range of working distances. The method is performed by providing a near imager to image targets over a relatively wider imaging field of view, by providing a far imager to image targets over a relatively narrower imaging field of view, by providing an illuminator to illuminate targets with illumination light, and by determining a distance to a target. The method is further performed by controlling a default one of the imagers, e.g., the far imager, to capture a minor portion of an image of the target, by determining a light intensity level of the captured minor portion of the image, by selecting at least one of the imagers based on the determined distance and/or the determined light intensity level, by controlling the illuminating light assembly to illuminate the target with illumination light at an illumination light level based on the determined distance and/or the determined light intensity level, and by setting the at least one imaging parameter of the selected at least one imager to a predetermined value based on the determined light intensity level and/or the determined distance. The method is still further performed by controlling the selected at least one imager, which has been set with the predetermined value, to capture an image of the target, which has been illuminated at the illumination light level.

Figure 1:
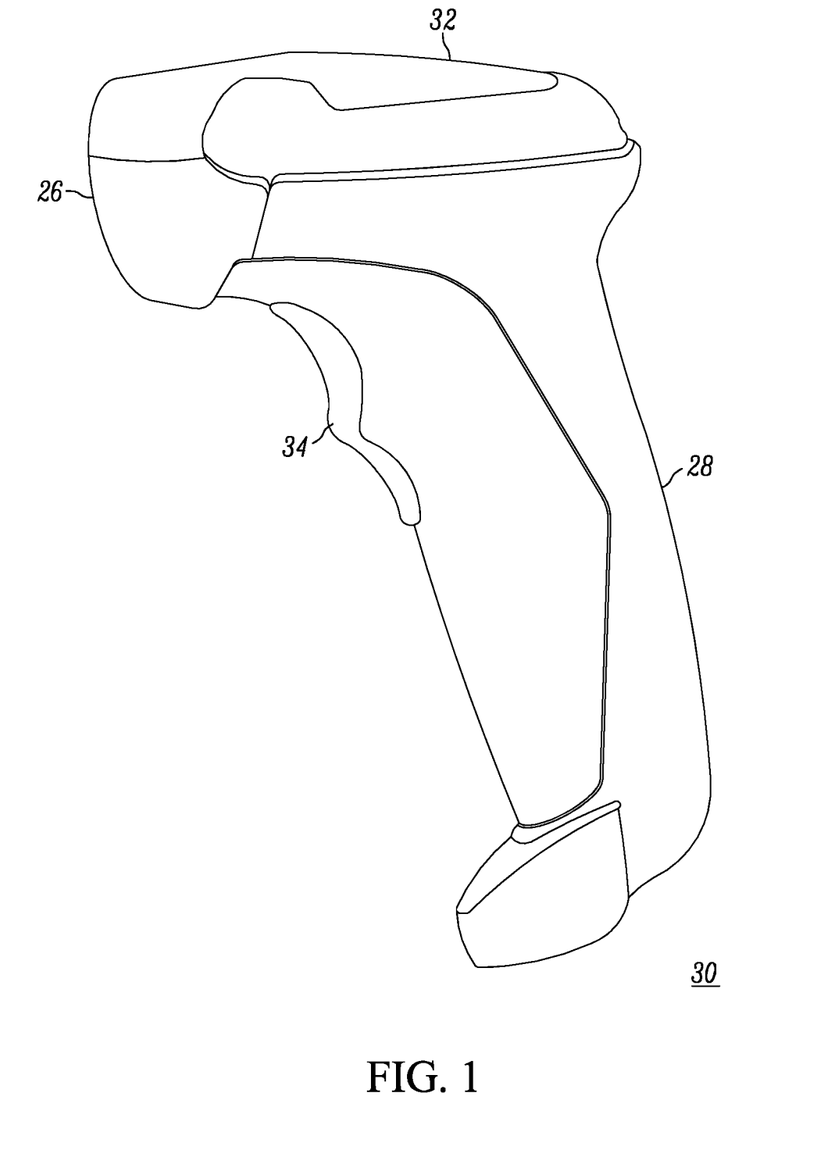
FIG. 1 is a side elevational view of a portable imaging reader operative for reading targets by image capture over an extended range of working distances in accordance with this disclosure.

Reference numeral 30 in FIG. 1 generally identifies an ergonomic imaging reader configured as a gun-shaped housing having an upper barrel or body 32 and a lower handle 28 tilted rearwardly away from the body 32 at an angle of inclination, for example, fifteen degrees, relative to the vertical. A light-transmissive window 26 is located adjacent the front or nose of the body 32 and is preferably also tilted at an angle of inclination, for example, fifteen degrees, relative to the vertical. The imaging reader 30 is held in an operator's hand and used in a handheld mode in which a trigger 34 is manually depressed to initiate imaging of targets, especially bar code symbols, to be read in an extended range of working distances, for example, on the order of thirty to fifty feet, away from the window 26. Housings of other configurations, as well as readers operated in the hands-free mode, could also be employed.

Figure 2:
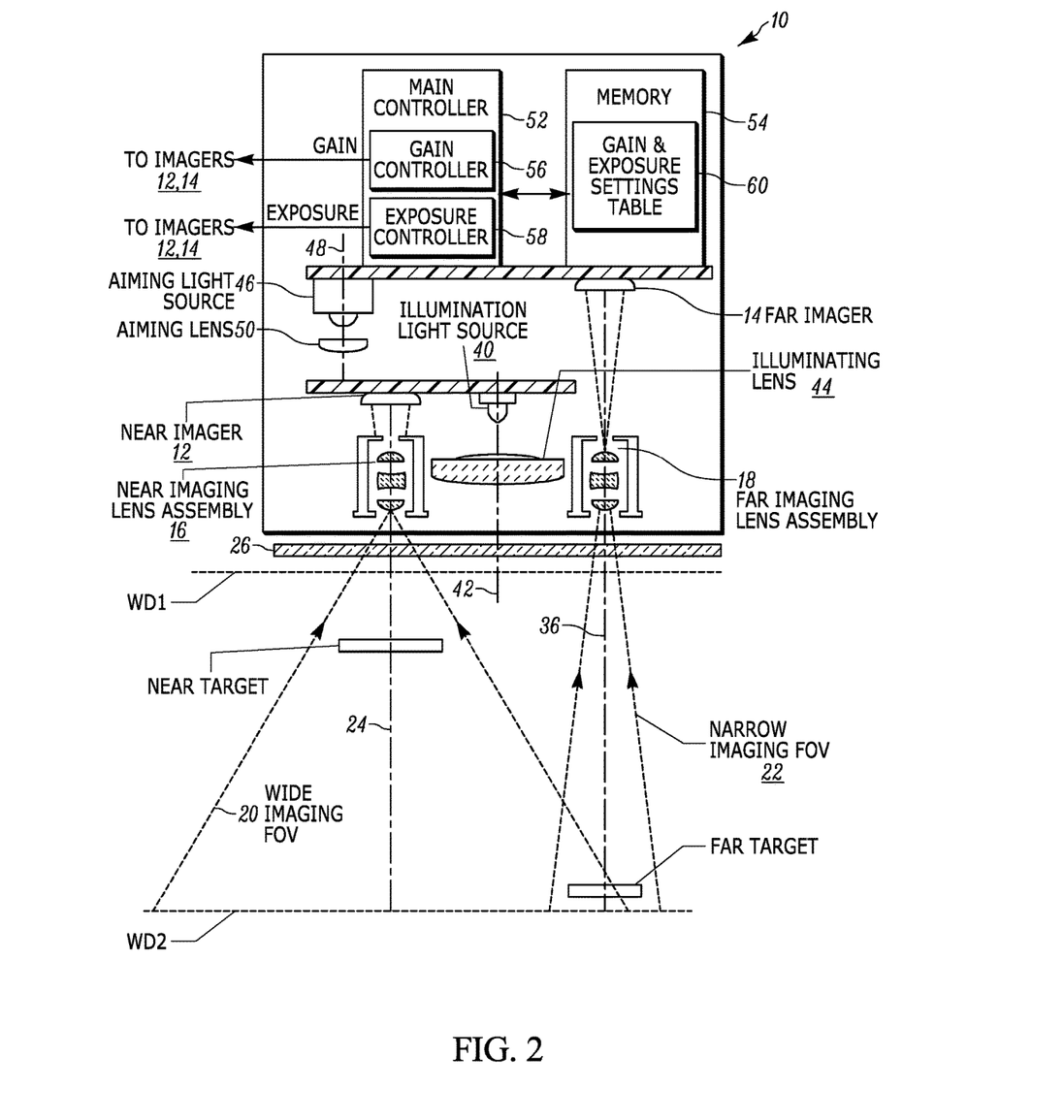
FIG. 2 is a schematic diagram of various components, including imaging, illuminating, and range finding assemblies supported on an imaging module that is mounted inside the reader of FIG. 1.
Figure 3:
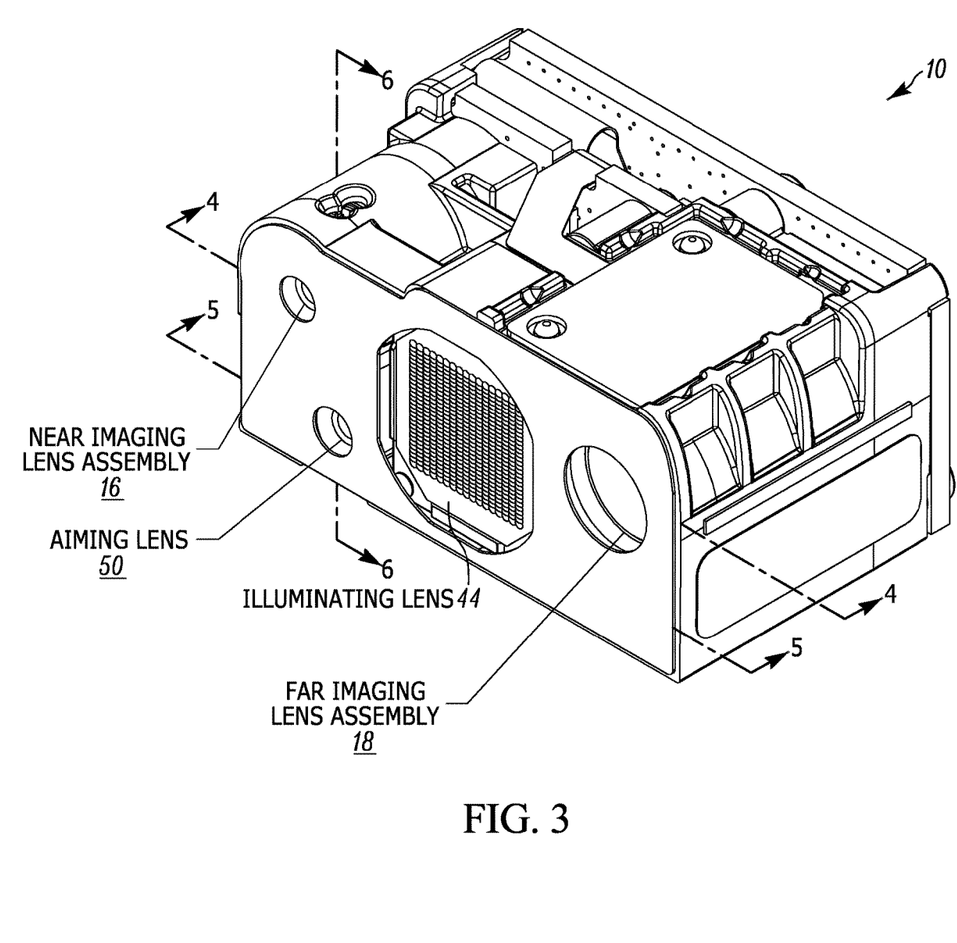
FIG. 3 is a perspective view of the imaging module of FIG. 2 in isolation.

As schematically shown in FIG. 2, and as more realistically shown in FIGS. 3-6, an imaging module 10 is mounted in the reader 30 behind the window 26 and is operative, as described below, for expeditiously setting one or more imaging parameters, e.g., exposure and/or gain values, of an imager for imaging targets to be electro-optically read by image capture through the window 26 over an extended range of working distances away from the module 10. A target may be located anywhere in a working range of distances between a close-in working distance (WD1) and a far-out working distance (WD2). In a preferred embodiment, WD1 is either at, or about eighteen inches away, from the window 26, and WD2 is much further away, for example, over about sixty inches away from the window 26. An intermediate working distance between WD1 and WD2 is about eighteen to about sixty inches away from the window 26. The module 10 includes an imaging assembly that has a near imaging sensor or imager 12, and a near imaging lens assembly 16 for capturing return light over a relatively wide imaging field of view 20, e.g., about thirty degrees, from a near target located in a close-in region of the range, e.g., from about zero inches to about eighteen inches away from the window 26, and for projecting the captured return light onto the near imager 12, as well as a far imaging sensor or imager 14, and a far imaging lens assembly 18 for capturing return light over a relatively narrow imaging field of view 22, e.g., about sixteen degrees, from a far target located in a far-out region of the range, e.g., greater than about sixty inches away from the window 26, and for projecting the captured return light onto the far imager 14. Although only two imagers 12, 14 and two imaging lens assemblies 16, 18 have been illustrated in FIG. 2, it will be understood that more than two could be provided in the module 10.

Each imager 12, 14 is a solid-state device, for example, a CCD or a CMOS imager having a one-dimensional array of addressable image sensors or pixels arranged in a single, linear row, or preferably a two-dimensional array of such sensors arranged in mutually orthogonal rows and columns, and operative for detecting return light captured by the respective imaging lens assemblies 16, 18 along respective imaging axes 24, 36 through the window 26. Each imaging lens assembly is advantageously a Cooke triplet, although other fixed focus and variable focus lens combinations can also be employed.

Figure 4:
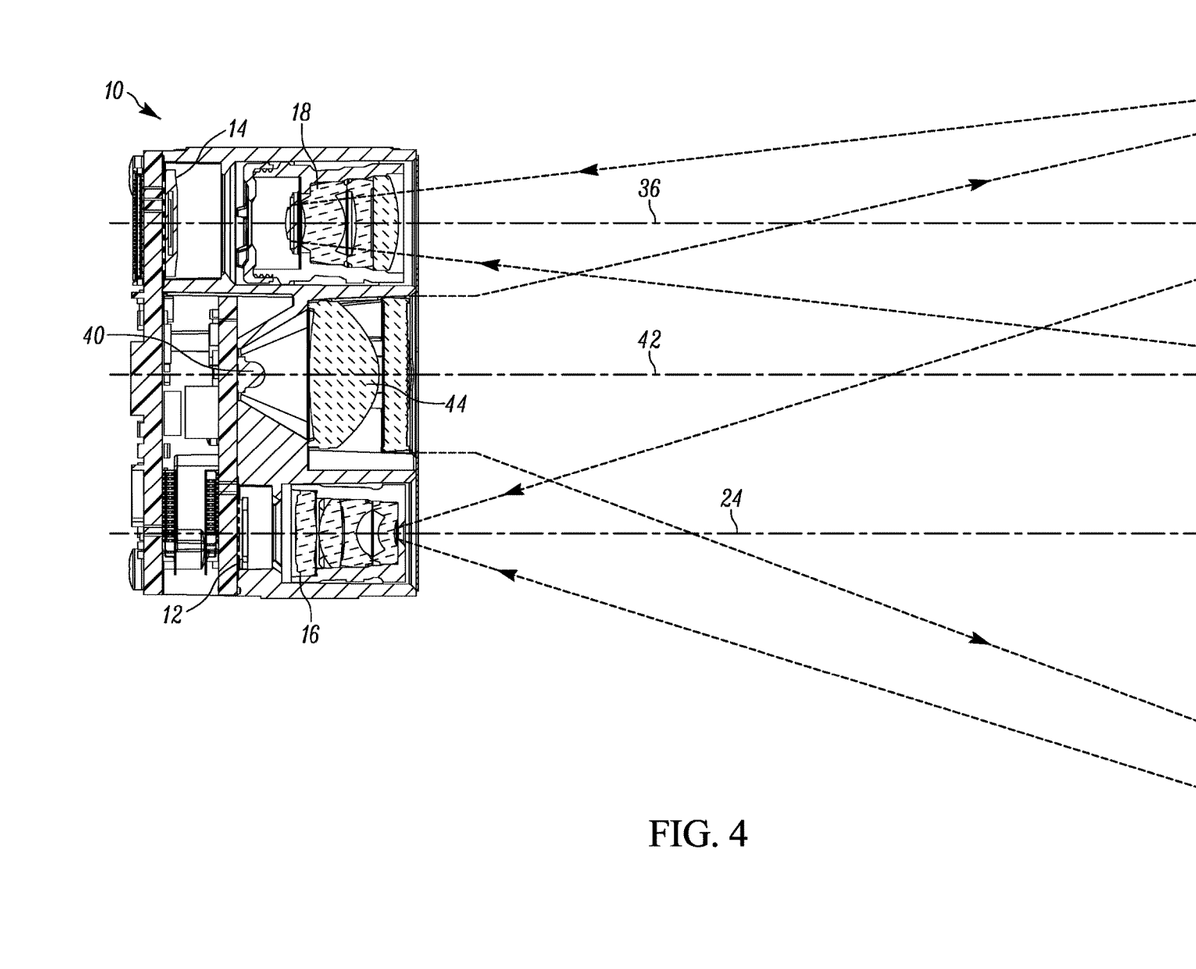
FIG. 4 is a cross-sectional view taken on line 4-4 of FIG. 3.
Figure 5:
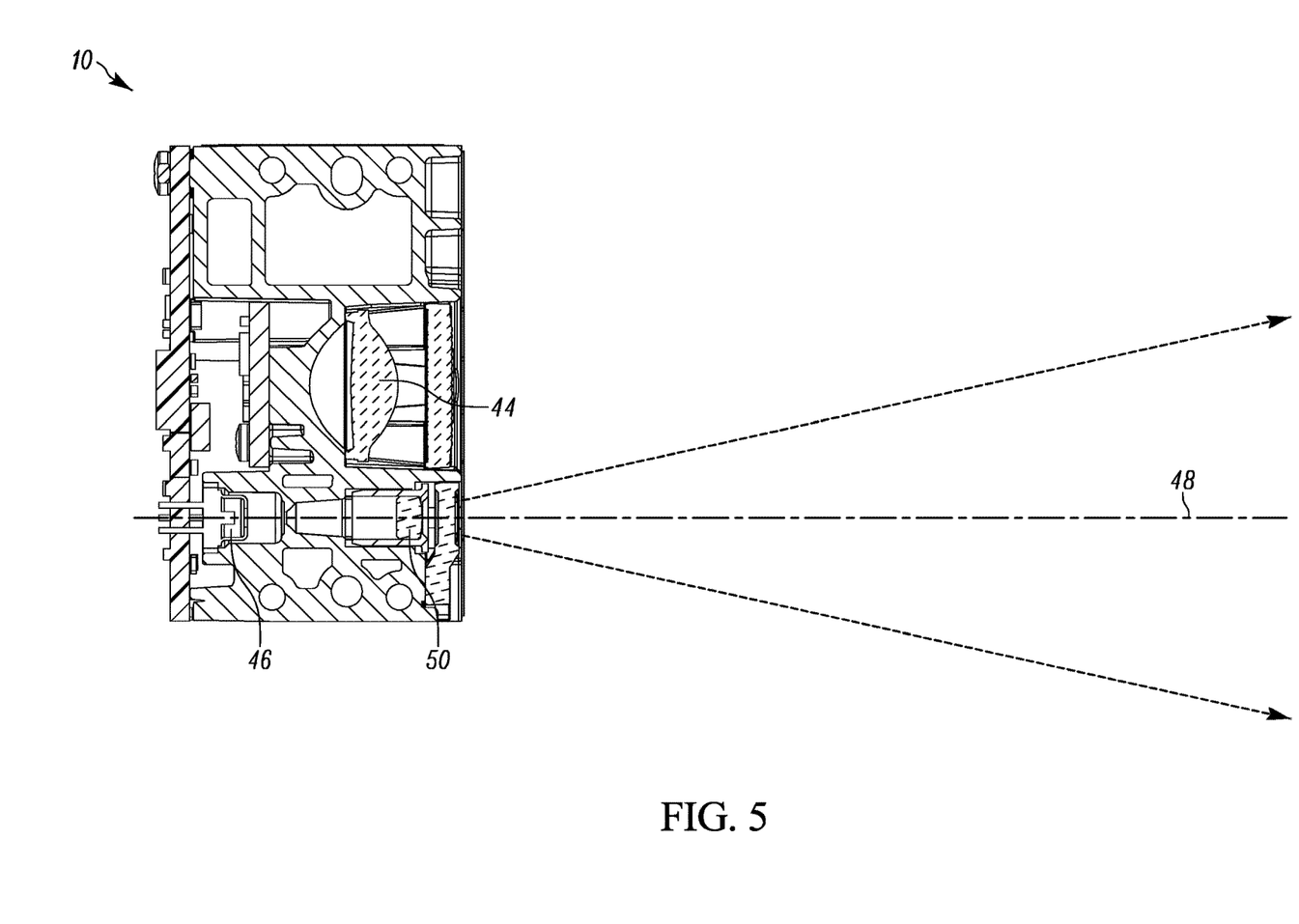
FIG. 5 is a cross-sectional view taken on line 5-5 of FIG. 3.
Figure 6:
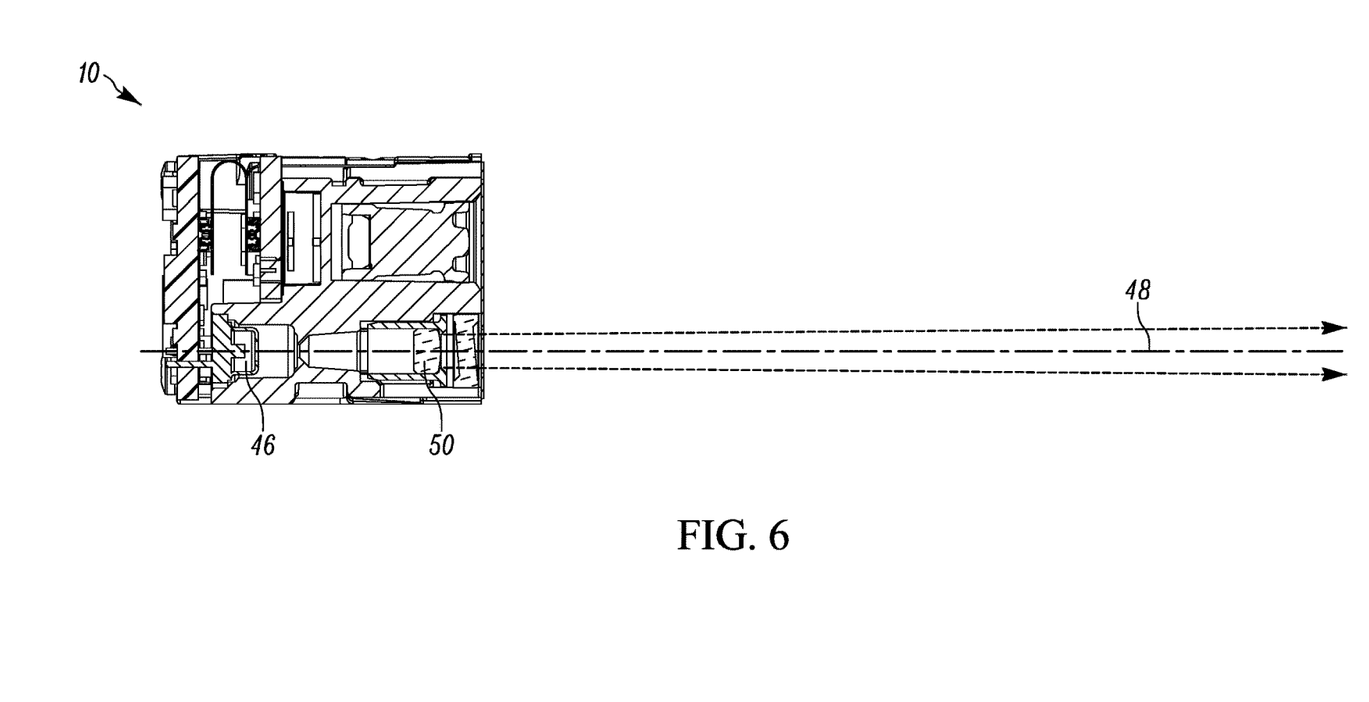
FIG. 6 is a vertical sectional view taken on line 6-6 of FIG. 3.

As also shown in FIGS. 2 and 4, an illuminating light assembly is also supported by the imaging module 10 and includes an illumination light source, e.g., at least one light emitting diode (LED) 40, stationarily mounted on an optical axis 42, and an illuminating lens assembly that includes an illuminating lens 44 also centered on the optical axis 42. The illuminating light assembly is shared by both imagers 12, 14. As further shown in FIGS. 2, 5 and 6, an aiming light assembly is also supported by the imaging module 10 and includes an aiming light source 46, e.g., a laser, stationarily mounted on an optical axis 48, and an aiming lens 50 centered on the optical axis 48. The aiming lens 50 may be a diffractive or a refractive optical element, and is operative for projecting a visible aiming light pattern on the target prior to reading.

As further shown in FIG. 2, the imagers 12, 14, the LED 40 and the laser 46 are operatively connected to a main controller or programmed microprocessor 52 operative for controlling the operation of these components. A memory 54 is connected and accessible to the controller 52. Preferably, the controller 52 is the same as the one used for processing the return light from the targets and for decoding the captured target images.

The aforementioned aiming light assembly also serves as a range finder to determine the distance to a target. The aiming axis 48 is offset from the imaging axes 24, 36 so that the resulting parallax provides target distance information. More particularly, the parallax between the aiming axis 48 and either one of the imaging axes 24, 36 provides range information from the pixel position of the aiming beam on one of the imaging sensor arrays. It is preferred to use the imaging axis 36 of the far imager 14, because the parallax error will be greater for the far imager 14 than for the near imager 12. It will be understood that other types of range finders, e.g., acoustic devices, can be employed to determine the target distance. Thus, the range finder locates the target to determine whether the target is in a close-in region, or an intermediate region, or a far-out region, of the range.

In operation, the main controller 52 controls a default one of the imagers, for example, the far imager 14, to capture a minor or fractional portion of an image of the target. For example, if the image is comprised of a two-dimensional array of pixels arranged in a predetermined row number (M) of rows and a predetermined column number (N) of columns, then the minor portion of the image is comprised of a subarray of pixels arranged in a number of rows less than M and in a number of columns less than N. The subarray can be located anywhere on the image; for example, it can be in a corner or central area of the image, or it can be the area of the image covered by the aiming light pattern.

The main controller 52 then determines a light intensity level of the captured minor portion of the image. This is performed much faster than in the known art where the light intensity level had to be determined from the entire image. For example, if the default far imager 14 operates at a predetermined frame rate, e.g., 60 frames per second (fps), and if the image is subdivided into four quadrants, then the main controller 52 can determine the light intensity level from the minor portion or quadrant at a rate that is four times faster, e.g., 240 fps, than the predetermined frame rate.

The main controller 52 then selects either the near imager 12 or the far imager 14 based on the determined distance and/or the determined light intensity level. Once the correct imager has been selected, the main controller 52 then sets the one or more imaging parameters, e.g., exposure and/or gain values, of the selected imager to a predetermined or optimum value based on the determined light intensity level and/or the determined distance. The aforementioned memory 54 stores a set of exposure values and/or a set of gain values in a look-up table 60. The main controller 52 has a gain controller 56 that can access the look-up table 60 and retrieve the correct gain value that corresponds to the determined distance and/or the determined light intensity level. The main controller 52 also has an exposure controller 58 that can access the look-up table 60 and retrieve the correct exposure value that corresponds to the determined distance and/or the determined light intensity level. Each set of exposure and gain values includes a range of different values, and is determined in advance by knowledge of the F-stop and responsivity of each imager as a function of distance away from the respective imager and/or the light intensity level.

The main controller 52 also controls the illuminating light assembly to illuminate the target with illumination light at an illumination light level based on the determined distance and/or the determined light intensity level. The main controller 52 energizes the illuminating light assembly to illuminate the target with illumination light of a relatively lesser intensity when the range finder determines that the target to be imaged and read is located in a close-in region of the range; or energizes the illuminating light assembly to illuminate the target with illumination light of a relatively greater intensity when the range finder determines that the target to be imaged and read is located in a far-out region of the range; or energizes the illuminating light assembly to illuminate the target with illumination light of a relatively intermediate intensity that is between the lesser intensity and the greater intensity when the range finder determines that the target to be imaged and read is located in an intermediate region that is between the close-in region and the far-out region of the range.

More particularly, the main controller 52 energizes the LED 40 with a variable electrical current to vary the intensity or level of the illumination light. By way of non-limiting numerical example, the electrical current is on the order of 30 milliamperes when the close-in region lies between about 0.0 inches and about eighteen inches from the window 26, is on the order of 150 milliamperes when the intermediate region lies between about eighteen inches and about sixty inches from the window 26, and is on the order of 600 milliamperes when the far-out region lies between about sixty inches and infinity from the window 26. The main controller 52 varies the intensity of the illumination light either as a continuous analog function, or as a stepwise, multi-level function, of the distance determined by the range finder.

Once the correct imager has been selected by the main controller 52, and once the gain and/or exposure values for the selected imager have been set by the gain and exposure controllers 56, 58, and once the illumination light level has been determined by the main controller 52, then the selected imager is operated by the main controller 52 to capture an image of the target to be read. Reader performance is rapid and aggressive.

Figure 7:
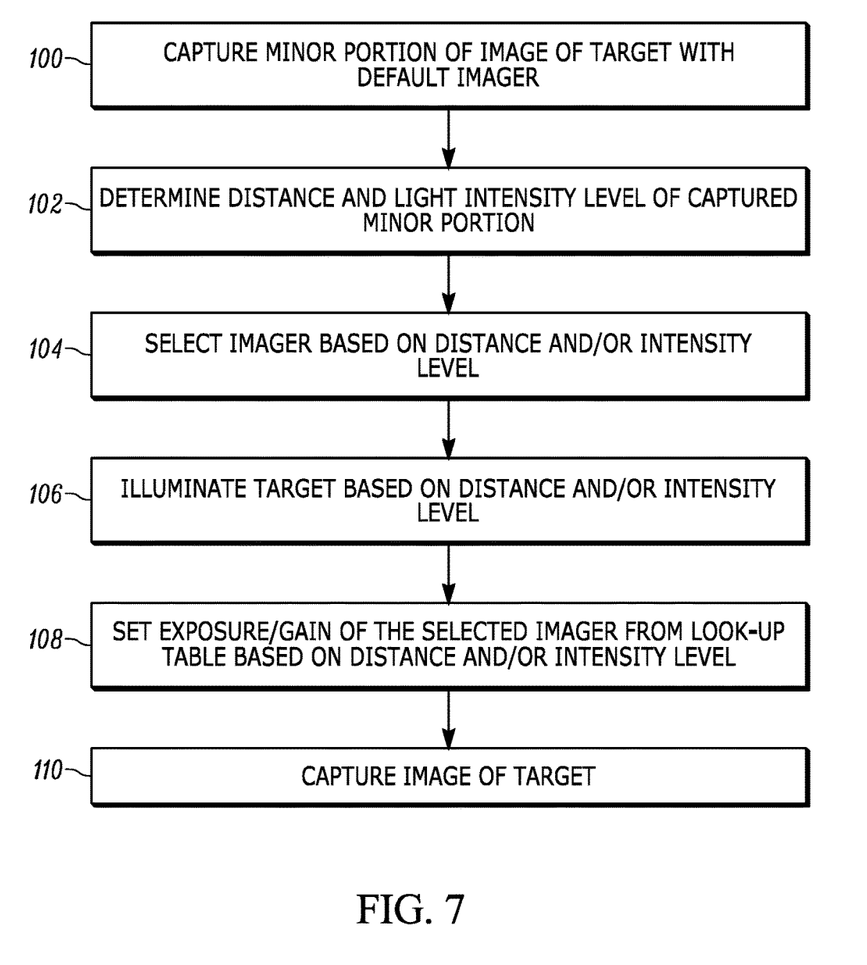
FIG. 7 is a flow chart depicting steps performed in accordance with a method of this disclosure.

The flow chart of FIG. 7 depicts the method disclosed herein. In step 100, the minor portion of the image of the target is captured by one of the imagers by default, e.g., the far imager 14. In step 102, the light intensity level of the captured minor portion of the image is determined, and the distance to the target is also determined. Either the far imager 14 or the near imager 12 may be selected based on the determined distance and/or the determined light intensity level in step 104. The target is illuminated with illumination light whose illumination level is also based on the determined distance and/or the determined light intensity level in step 106. Then, optimum exposure and/or gain values are set for the selected imager in step 108 by referral to the look-up table 60. In step 110, the selected imager, whose exposure and/or gain has already been set, captures an image of the target, which has been illuminated at the illumination light level.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. An imaging module for setting at least one imaging parameter of at least one imager for imaging targets to be electro-optically read over a range of working distances away from the module, the module comprising:
    an imaging assembly including a near imager for imaging targets over a relatively wider imaging field of view, and a far imager for imaging targets over a relatively narrower imaging field of view, the near imager being separate from the far imager;

an illuminating light assembly for illuminating targets with illumination light;

a range finder for determining a distance to a target; and a main controller for controlling only a default one of the imagers to capture a minor portion of an image of the target, for determining a light intensity level of the captured minor portion of the image, for selecting at least one of the imagers based on at least one of the determined distance and the determined light intensity level, for controlling the illuminating light assembly to illuminate the target with illumination light at an illumination light level based on the at least one of the determined distance and the determined light intensity level, for setting the at least one imaging parameter of the selected at least one imager to a predetermined value based on the at least one of the determined light intensity level and the determined distance, and for controlling the selected at least one imager, which has been set with the predetermined value, to capture an image of the target, which has been illuminated at the illumination light level.

2. The module of claim 1, and a memory accessible to the main controller for storing a plurality of predetermined values of the at least one imaging parameter for retrieval by the main controller, and wherein the predetermined values are different based on the at least one of the determined light intensity level and the determined distance.

3. The module of claim 2, wherein the main controller includes an exposure controller and a gain controller, wherein the plurality of predetermined values stored in the memory include a set of exposure values for retrieval by the exposure controller and a set of gain values for retrieval by the gain controller, wherein the exposure values are different based on the at least one of the determined light intensity level and the determined distance, and wherein the gain values are different based on the at least one of the determined light intensity level and the determined distance.

4. The module of claim 1, wherein the default imager is controlled by the main controller to operate at a predetermined frame rate, and wherein the main controller determines the light intensity level from the minor portion of the image at a rate faster than the predetermined frame rate.

5. The module of claim 1, wherein the image is comprised of pixels arranged in a predetermined row number of rows and a predetermined column number of columns, and wherein the minor portion of the image is comprised of pixels arranged in a number of rows less than the predetermined row number and in a number of columns less than the predetermined column number.

6. The module of claim 1, wherein the main controller is operative for controlling the illuminating light assembly to illuminate the target with illumination light having a relatively lesser illumination light level when the range finder determines that the target to be imaged and read is located in a close-in region of the range, for controlling the illuminating light assembly to illuminate the target with illumination light of a relatively greater illumination light level when the range finder determines that the target to be imaged and read is located in a far-out region of the range, and for controlling the illuminating light assembly to illuminate the target with illumination light of a relatively intermediate illumination light level that is between the lesser illumination light level and the greater illumination light level when the range finder determines that the target to be imaged and read is located in an intermediate region that is between the close-in region and the far-out region of the range.

7. The module of claim 1, wherein the main controller varies the illumination light level as one of a continuous and a stepwise function based on the at least one of the determined distance and the determined light intensity level.

8. The module of claim 1, wherein each imager captures return light from the target along an optical axis, and wherein the range finder includes an aiming assembly for emitting an aiming beam along an aiming axis that is offset from at least one of the optical axes.

9. An imaging reader for reading targets by image capture over a range of working distances away from the reader, comprising:

a housing having a light-transmissive window; and an imaging module for setting at least one imaging parameter of at least one imager for imaging the targets, the module including an imaging assembly including a near imager for imaging targets over a relatively wider imaging field of view, and a far imager for imaging targets over a relatively narrower imaging field of view, the near imager being separate from the far imager, an illuminating light assembly for illuminating targets with illumination light, a range finder for determining a distance to a target, and a main controller for controlling only a default one of the imagers to capture a minor portion of an image of the target, for determining a light intensity level of the captured minor portion of the image, for selecting at least one of the imagers based on at least one of the determined distance and the determined light intensity level, for controlling the illuminating light assembly to illuminate the target with illumination light at an illumination light level based on the at least one of the determined distance and the determined light intensity level, for setting the at least one imaging parameter of the selected at least one imager to a predetermined value based on the at least one of the determined light intensity level and the determined distance, and for controlling the selected at least one imager, which has been set with the predetermined value, to capture an image of the target, which has been illuminated at the illumination light level.

10. The reader of claim 9, and a memory accessible to the main controller for storing a plurality of predetermined values of the at least one imaging parameter for retrieval by the main controller, and wherein the predetermined values are different based on the at least one of the determined light intensity level and the determined distance.

11. The reader of claim 10, wherein the main controller includes an exposure controller and a gain controller, wherein the plurality of predetermined values stored in the memory include a set of exposure values for retrieval by the exposure controller and a set of gain values for retrieval by the gain controller, wherein the exposure values are different based on the at least one of the determined light intensity level and the determined distance, and wherein the gain values are different based on the at least one of the determined light intensity level and the determined distance.

12. The reader of claim 9, wherein the default imager is controlled by the main controller to operate at a predetermined frame rate, and wherein the main controller determines the light intensity level from the minor portion of the image at a rate faster than the predetermined frame rate.

13. The reader of claim 9, wherein the image is comprised of pixels arranged in a predetermined row number of rows and a predetermined column number of columns, and wherein the minor portion of the image is comprised of pixels arranged in a number of rows less than the predetermined row number and in a number of columns less than the predetermined column number.

14. A method of setting at least one imaging parameter of at least one imager for imaging targets to be electro-optically read over a range of working distances, the method comprising:
   providing a near imager to image targets over a relatively wider imaging field of view;
   providing a far imager to image targets over a relatively narrower imaging field of view, the near imager being separate from the far imager;
   providing an illuminator to illuminate targets with illumination light;
   determining a distance to a target;
   controlling only a default one of the imagers to capture a minor portion of an image of the target;
   determining a light intensity level of the captured minor portion of the image;
   selecting at least one of the imagers based on at least one of the determined distance and the determined light intensity level;
   controlling the illuminating light assembly to illuminate the target with illumination light at an illumination light level based on the at least one of the determined distance and the determined light intensity level;
   setting the at least one imaging parameter of the selected at least one imager to a predetermined value based on the at least one of the determined light intensity level and the determined distance; and
   controlling the selected at least one imager, which has been set with the predetermined value, to capture an image of the target, which has been illuminated at the illumination light level.

15. The method of claim 14, and storing a plurality of predetermined values of the at least one imaging parameter, and configuring the predetermined values to be different based on the at least one of the determined light intensity level and the determined distance.

16. The method of claim 15, and storing the plurality of predetermined values as a set of exposure values and as a set of gain values, and configuring the exposure values to be different based on the at least one of the determined light intensity level and the determined distance, and configuring the gain values to be different based on the at least one of the determined light intensity level and the determined distance.

17. The method of claim 14, and controlling the default imager to operate at a predetermined frame rate, and wherein the light intensity level is determined from the minor portion of the image at a rate faster than the predetermined frame rate.

18. The method of claim 14, and configuring the image of pixels arranged in a predetermined row number of rows and a predetermined column number of columns, and configuring the minor portion of the image of pixels arranged in a number of rows less than the predetermined row number and in a number of columns less than the predetermined column number.

19. The method of claim 14, and illuminating the target with illumination light having a relatively lesser illumination light level upon the determination that the target to be imaged and read is located in a close-in region of the range, and with illumination light of a relatively greater illumination light level upon the determination that the target to be imaged and read is located in a far-out region of the range, and with illumination light of a relatively intermediate illumination light level that is between the lesser illumination light level and the greater illumination light level upon the determination that the target to be imaged and read is located in an intermediate region that is between the close-in region and the far-out region of the range.

20. The method of claim 14, wherein the determining of the distance to the target is performed by emitting an aiming beam along an aiming axis that is offset from an optical axis along which the selected at least one imager captures the image.

* * * * *